US012776507B2

(12) United States Patent

Shimizu et al.

(10) Patent No.: US 12,776,507 B2
(45) Date of Patent: Oct. 27, 2026

(54) ELECTROCHEMICAL HYDROGEN COMPRESSION SYSTEM

(71) Applicant: HONDA MOTOR CO., LTD., Tokyo (JP)

(72) Inventors: Ko Shimizu, Wako (JP); Hayato Daimon, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 507 days.

(21) Appl. No.: 18/406,716

(22) Filed: Jan. 8, 2024

(65) Prior Publication Data

US 2024/0243329 A1 Jul. 18, 2024

(30) Foreign Application Priority Data

Jan. 13, 2023 (JP) ................................ 2023-003445

(51) Int. Cl.
*H01M 8/22* (2006.01)
*H01M 8/04119* (2016.01)
(Continued)

(52) U.S. Cl.
CPC ......... *H01M 8/22* (2013.01); *H01M 8/04126* (2013.01); *H01M 8/04156* (2013.01);
(Continued)

(58) Field of Classification Search
CPC ............... H01M 8/22; H01M 8/04126; H01M 8/04156; H01M 8/04425; H01M 8/04544;
(Continued)

(56) References Cited

U.S. PATENT DOCUMENTS

2019/0368483 A1 12/2019 Wakita et al.
2022/0185665 A1* 6/2022 Daimon .................... C25B 1/02
(Continued)

FOREIGN PATENT DOCUMENTS

JP 2019-210205 A 12/2019
JP 2022-094891 A 6/2022
JP 2022-119250 A 8/2022

OTHER PUBLICATIONS

"Using a PEM (Hydrogen) Fuel Cell" accessed from https://community.robotshop.com/forum/t/using-a-pem-hydrogen-fuel-cell/12922 on Jul. 20, 2026 (Nov. 2009).*
(Continued)

*Primary Examiner* — Bryan D. Ripa
(74) *Attorney, Agent, or Firm* — Carrier, Shende & Associates P.C.; Joseph P. Carrier; Fulchand P. Shende

(57) ABSTRACT

An electrochemical hydrogen compression system is equipped with a control device that controls an electrical power source device, a hydrogen supply valve, a pathway connector, and a water supply device. The control device, upon receiving an operation start command, causes liquid water to be supplied from a water source to a hydrogen compression stack until a predetermined water supply period has elapsed. Thereafter, the control device causes the supply of a hydrogen gas to the hydrogen compression stack to be started. After a predetermined hydrogen gas supply period has elapsed, the control device causes the supply of an electrical current to the hydrogen compression stack to be started.

7 Claims, 3 Drawing Sheets

(51) Int. Cl.
*H01M 8/0438* (2016.01)
*H01M 8/04537* (2016.01)
*H01M 50/367* (2021.01)

(52) U.S. Cl.
CPC ... *H01M 8/04425* (2013.01); *H01M 8/04544* (2013.01); *H01M 50/367* (2021.01)

(58) Field of Classification Search
CPC ........... H01M 50/367; H01M 8/04089; H01M 8/04201; H01M 8/04225; H01M 8/04302; Y02E 60/50
See application file for complete search history.

(56) References Cited

U.S. PATENT DOCUMENTS

2022/0274055 A1* 9/2022 Schmidt ............... B01D 53/326
2022/0298656 A1* 9/2022 Takasugi ................... C25B 1/02
2022/0372966 A1* 11/2022 Sugai ........................ C25B 1/02

OTHER PUBLICATIONS

Office Action dated Nov. 26, 2024 issued in the corresponding Japanese Patent Application 2023-003445 with the English machine translation thereof.

* cited by examiner

ELECTROCHEMICAL HYDROGEN COMPRESSION SYSTEM

CROSS-REFERENCE TO RELATED APPLICATIONS

This application is based upon and claims the benefit of priority from Japanese Patent Application No. 2023-003445 filed on Jan. 13, 2023, the contents of which are incorporated herein by reference.

BACKGROUND OF THE INVENTION

Field of the Invention

The present invention relates to an electrochemical hydrogen compression system.

Description of the Related Art

In recent years, in order to make it possible for more people to be capable of relying thereon at an affordable cost, and to ensure access to sustainable and advanced energy, research and development have been conducted in relation to an electrochemical hydrogen compression system that contributes to energy efficiency.

The electrochemical hydrogen compression system disclosed in JP 2022-094891 A includes an electrochemical hydrogen compression device that compresses hydrogen. The electrochemical hydrogen compression device is equipped with a hydrogen compression stack (hydrogen compression part), and an electrical power source device (power supply). The hydrogen compression stack is equipped with a unit cell containing an electrolyte membrane, an anode power feeder, and a cathode power feeder. The electrical power source device supplies an electrical current to the hydrogen compression stack, and thereby causes the hydrogen compression stack to generate high pressure hydrogen gas having a higher pressure than the hydrogen gas supplied to the hydrogen compression stack.

In JP 2022-094891 A, it is disclosed that, based on information regarding a humidified state of the electrolyte membrane, a discharge port of the hydrogen compression stack from which non-reacted hydrogen gas is discharged is regulated, and water vapor is retained in the unit cell to thereby place the electrolyte membrane in a humidified state.

SUMMARY OF THE INVENTION

However, as the period during which the electrochemical hydrogen compression device is stopped becomes longer, the more the electrolyte membrane tends to become dry. In the case that the electrolyte membrane becomes dry, the distribution of the water contained within the electrolyte membrane tends to be uneven. It may be considered that when the aforementioned technique of JP 2022-094891 A is put to use, the electrolyte membrane will become placed in a humidified state again. However, a problem arises in that a considerable amount of time is required until the distribution of the water contained within the electrolyte membrane becomes substantially uniform.

The present invention has the object of solving the aforementioned problem.

An aspect of the present invention is characterized by an electrochemical hydrogen compression system, including a hydrogen compression stack equipped with a unit cell including an electrolyte membrane, an anode, and a cathode, an electrical power source device configured to supply an electrical current to the hydrogen compression stack, and to generate a high pressure hydrogen gas having a higher pressure than the hydrogen gas supplied to the hydrogen compression stack, and a hydrogen supply source configured to supply the hydrogen gas to the hydrogen compression stack via a supply pathway communicating with an anode side of the unit cell, a hydrogen supply valve disposed in the supply pathway, a pathway connector configured to connect a water source to the supply pathway via a water supply pathway, or alternatively, to disconnect the connection, a water supply device configured to supply liquid water from the water source to the hydrogen compression stack, and a control device configured to control the electrical power source device, the hydrogen supply valve, the pathway connector, and the water supply device, wherein the control device, upon receiving an operation start command, causes the liquid water to be supplied from the water source to the hydrogen compression stack until a predetermined water supply period has elapsed, and thereafter, causes the supply of the hydrogen gas to the hydrogen compression stack to be started, and after a predetermined hydrogen gas supply period has elapsed, causes the supply of the electrical current to the hydrogen compression stack to be started.

According to the above-described aspect, the distribution of water contained within the electrolyte membrane can be made substantially uniform in a short time period. As a result, the hydrogen compression stack can be started at an early stage.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
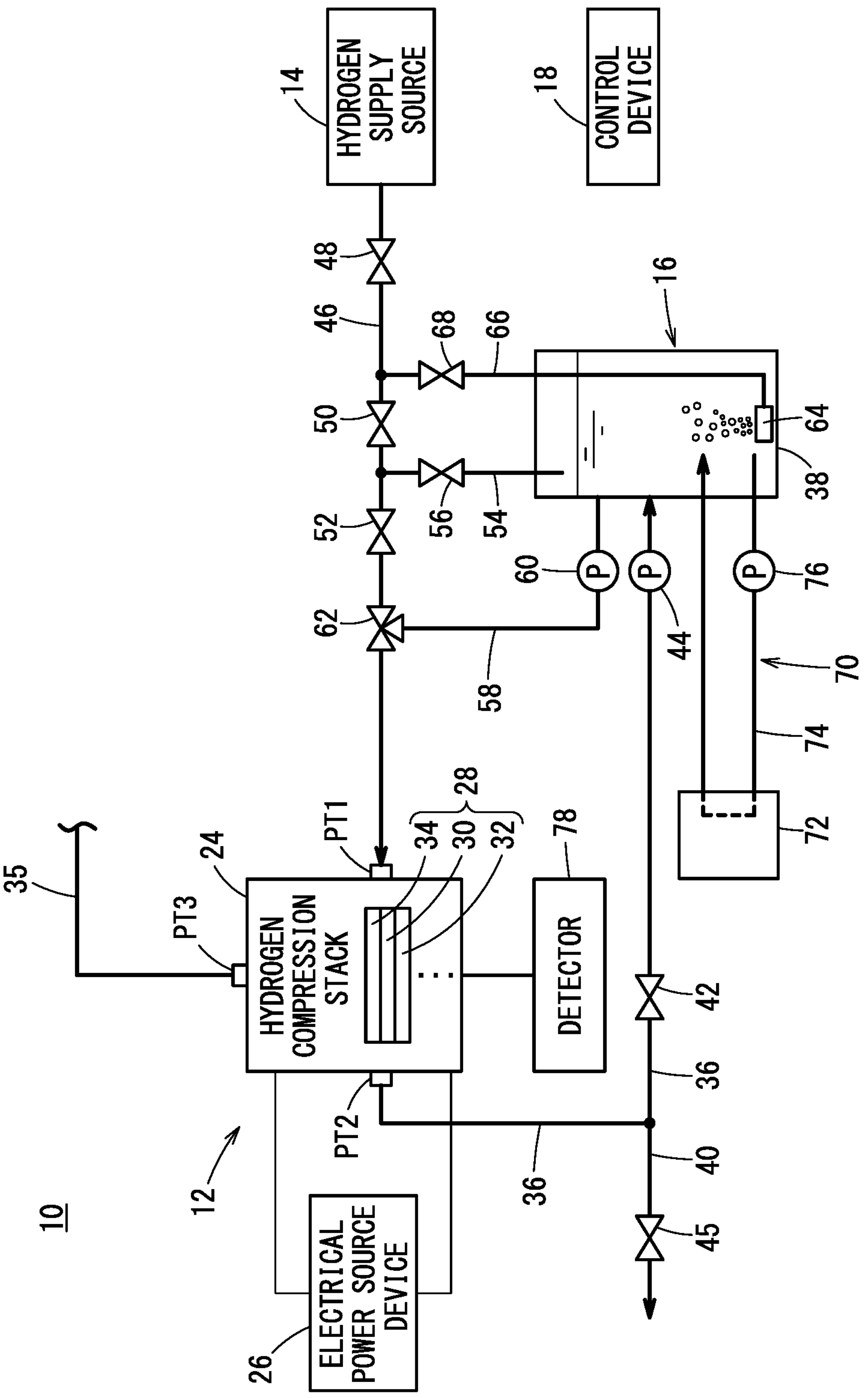
FIG. 1 is a schematic diagram showing an electrochemical hydrogen compression system according to an embodiment.

FIG. 1 is a schematic diagram showing an electrochemical hydrogen compression system 10 according to an embodiment. The electrochemical hydrogen compression system 10 is equipped with an electrochemical hydrogen compression device 12, a hydrogen supply source 14, a humidifier 16, and a control device 18.

The electrochemical hydrogen compression device 12 is a device that electrochemically compresses a hydrogen gas. The electrochemical hydrogen compression device 12 includes a hydrogen compression stack 24 and an electrical power source device 26.

The hydrogen compression stack 24 includes an introduction port PT1, a discharge port PT2, and a high pressure hydrogen port PT3. The introduction port PT1 is a port for introducing the hydrogen gas, and communicates with an anode side of each of respective unit cells 28. The discharge port PT2 is a port for discharging a non-reacted hydrogen gas, and communicates with the anode side of each of the unit cells 28. The high pressure hydrogen port PT3 is a port for discharging a high pressure hydrogen gas generated in the unit cells 28, and communicates with a cathode side of each of the unit cells 28.

The plurality of unit cells 28 are each respectively of the same configuration. Each of the unit cells 28 includes an electrolyte membrane 30, an anode 32 provided on one surface of the electrolyte membrane 30, and a cathode 34 provided on another surface of the electrolyte membrane 30.

The electrolyte membrane 30, for example, is a solid polymer electrolyte membrane (cation ion exchange membrane). The electrolyte membrane 30 may be reinforced on the anode side thereof with a protective sheet (not shown) containing a fibrous skeletal framework. Further, for the electrolyte membrane 30, an HC (hydrocarbon) electrolyte can be used in addition to a fluorine electrolyte. The electrolyte membrane 30 is sandwiched between the anode 32 and the cathode 34.

The anode 32 includes an anode catalyst layer joined to one surface of the electrolyte membrane 30, and an anode power feeder laminated on the anode catalyst layer. The cathode 34 includes a cathode catalyst layer joined to another surface of the electrolyte membrane 30, and a cathode power feeder laminated on the cathode catalyst layer. The anode power feeder and the cathode power feeder are formed with a structure through which hydrogen gas is capable of flowing.

When an electrical current is supplied between the anode 32 and the cathode 34, a portion of the hydrogen gas supplied to the anode 32 from the introduction port PT1 is converted into protons ($H^+$ ions) by a catalytic reaction. The converted protons are transported to the cathode 34 via the electrolyte membrane 30. At the cathode 34, a high pressure hydrogen gas is generated by an electrochemical reaction in which the transported protons are used.

The high pressure hydrogen gas flows out from the high pressure hydrogen port PT3. The high pressure hydrogen gas that flows out from the high pressure hydrogen port PT3 is supplied, for example, to a tank via a discharge pathway 35. The discharge pathway 35 is a pathway that guides the high pressure hydrogen gas discharged from the hydrogen compression stack 24. A back pressure valve or the like is provided in the discharge pathway 35.

The non-reacted hydrogen gas at the anode 32 flows out from the discharge port PT2. The hydrogen gas that flows out from the exhaust port PT2 is supplied into a hermetically sealed container 38 via a low pressure discharge pathway 36, or alternatively, is exhausted through a vent pathway 40 that branches off from the low pressure discharge pathway 36. A discharge valve 42 and a pump 44 are disposed in the low pressure discharge pathway 36. A vent valve 45 is provided in the vent pathway 40. Each of the discharge valve 42 and the vent valve 45 opens or closes under the control of the control device 18. The pump 44 is driven under the control of the control device 18, and applies a flowing force to the hydrogen gas from an upstream side to a downstream side.

The electrical power source device 26 supplies an electrical current to the hydrogen compression stack 24. Consequently, a high pressure hydrogen gas, which has a higher pressure than the hydrogen gas supplied to the hydrogen compression stack 24, is generated in the hydrogen compression stack 24.

The electrical power source device 26 applies a voltage to the anode 32 and the cathode 34 of each of the unit cells 28, and thereby supplies the electrical current to the unit cells 28. Under the control of the control device 18, the electrical power source device 26 is configured to be capable of adjusting a magnitude of the electrical current supplied to each of the unit cells 28. As the electrical current value supplied to the unit cells 28 becomes greater, the amount of the high pressure hydrogen gas generated in the unit cells 28 becomes more plentiful.

The hydrogen supply source 14 is a device that is capable of supplying hydrogen gas. The hydrogen supply source 14 may be a pallet on which a plurality of gas cylinders in which hydrogen gas is stored are gathered together. Alternatively, the hydrogen supply source 14 may be a tank in which the hydrogen gas is stored. The hydrogen supply source 14 supplies the hydrogen gas to the hydrogen compression stack 24 via a supply pathway 46.

The supply pathway 46 is a pathway that guides the hydrogen gas from the hydrogen supply source 14 to the hydrogen compression stack 24. An upstream end of the supply pathway 46 is connected to a non-illustrated output port of the hydrogen supply source 14. A downstream end of the supply pathway 46 is connected to the introduction port PT1 of the hydrogen compression stack 24. The supply pathway 46 is provided with a pressure reducing valve 48, a hydrogen supply valve 50, and a flow rate adjustment valve 52 in this order from an upstream side to a downstream side.

Although there is one pressure reducing valve 48 shown in FIG. 1, two or more pressure reducing valves 48 may be provided. The hydrogen supply valve 50 opens or closes under the control of the control device 18. Under the control of the control device 18, the flow rate adjustment valve 52 adjusts the flow rate of the hydrogen gas supplied to the hydrogen compression stack 24.

The humidifier 16 is a device that serves to humidify the hydrogen gas. The humidifier 16 includes the hermetically sealed container 38. The humidifier 16 vaporizes liquid water that is stored in the hermetically sealed container 38. The humidifier 16 supplies the water vapor to the supply pathway 46 via an outlet pathway 54.

The outlet pathway 54 is a pathway that guides the water vapor from the humidifier 16 to the supply pathway 46. An upstream end of the outlet pathway 54 is arranged in a gas phase space of the hermetically sealed container 38. A downstream end of the outlet pathway 54 is connected to the supply pathway 46 between the hydrogen supply valve 50 and the flow rate adjustment valve 52. An outlet valve 56 is provided in the outlet pathway 54. The outlet valve 56 opens or closes under the control of the control device 18.

The hermetically sealed container 38 communicates with the supply pathway 46 via a water supply pathway 58. The water supply pathway 58 is a pathway that guides the liquid water stored in the hermetically sealed container 38 to the supply pathway 46. A water supply device 60 is provided in the water supply pathway 58. A pathway connector 62 is provided at a connected portion between the water supply pathway 58 and the supply pathway 46.

The water supply device 60 is a device that supplies the liquid water stored in the hermetically sealed container 38 to the hydrogen compression stack 24. The water supply device 60 is driven under the control of the control device 18, and applies a flowing force to the hydrogen gas from an upstream side to a downstream side. As the water supply device 60, there may be cited a pump or the like. In FIG. 1, an example is shown in which the water supply device 60 is a pump. The pathway connector 62 is a device that connects the hermetically sealed container 38 of the humidifier 16 to the supply pathway 46 via the water supply pathway 58, or alternatively, disconnects the connection. As the pathway connector 62, there may be cited a three-way valve or the like. In FIG. 1, an example is shown in which the pathway connector 62 is a three-way valve. In the case that the pathway connector 62 connects the hermetically sealed container 38 to the supply pathway 46, the hydrogen gas is not supplied from the hydrogen supply source 14 to the hydrogen compression stack 24. On the other hand, in the case that the pathway connector 62 suspends the connection of the hermetically sealed container 38 to the supply pathway 46, the hydrogen gas is supplied from the hydrogen supply source 14 to the hydrogen compression stack 24.

The humidifier 16 may be a bubbler type humidifier. In FIG. 1, an example is shown in which the humidifier 16 is a bubbler type humidifier. In this case, the humidifier 16 includes a bubble generator 64. The bubble generator 64 is placed within the liquid water inside the hermetically sealed container 38. The bubble generator 64 releases the hydrogen gas supplied via an inlet pathway 66 from the supply pathway 46, as bubbles into the liquid water. Consequently, the hydrogen gas contains water (water vapor) therein. The hydrogen gas containing the water is supplied to the supply pathway 46 via the outlet pathway 54.

The inlet pathway 66 is a pathway that guides a portion of the hydrogen gas flowing through the supply pathway 46 from the supply pathway 46 to the bubble generator 64. An upstream end of the inlet pathway 66 is connected to a location in the supply pathway 46 that is more upstream than a location to which the downstream end of the outlet pathway 54 is connected. A downstream end of the inlet pathway 66 is connected to the bubble generator 64. An inlet valve 68 is provided in the inlet pathway 66. The inlet valve 68 opens or closes under the control of the control device 18.

Moreover, a temperature adjustment device 70 that adjusts the temperature of the liquid water stored in the hermetically sealed container 38 may be provided. The temperature adjustment device 70 is equipped with a heat exchanger 72, a circulation pathway 74 that circulates between the heat exchanger 72 and the hermetically sealed container 38, and a pump 76 provided in the circulation pathway 74. The temperature adjustment device 70 drives the pump 76, and thereby causes the liquid water to circulate between the heat exchanger 72 and the hermetically sealed container 38 via the circulation pathway 74, and adjusts the temperature of the liquid water to a set temperature by undergoing heat exchange with the heat exchanger 72.

The control device 18 is a computer that controls the electrochemical hydrogen compression system 10. The control device 18 includes one or more processors and a storage medium. As the storage medium, there may be cited a volatile memory and a nonvolatile memory. As the processor, there may be cited a CPU, an MCU, or the like. As the volatile memory, for example, there may be cited a RAM or the like. As the nonvolatile memory, for example, there may be cited a ROM, a flash memory, or the like.

A detector 78 is connected to the control device 18. The control device 18, using the detector 78, acquires an electrical value of the hydrogen compression stack 24 in the case that the electrical current of the hydrogen compression stack 24 is of a predetermined value. The electrical value is a value indicating a voltage or a resistance. A relationship is defined such that, as the voltage of the hydrogen compression stack 24 becomes higher as compared with a reference voltage, which is a voltage suitable for driving the hydrogen compression stack 24, the water remaining in the unit cells 28 becomes more plentiful. Similarly, a relationship is defined such that, as the resistance of the hydrogen compression stack 24 becomes higher as compared with a reference resistance, which is a resistance suitable for driving the hydrogen compression stack 24, the water remaining in the unit cells 28 becomes more plentiful. Therefore, by acquiring the electrical value in the case that the electrical current of the hydrogen compression stack 24 is of the predetermined value, the control device 18 is capable of determining the amount of the water remaining in the unit cells 28.

The detector 78 is provided in the hydrogen compression stack 24. The detector 78 may be a voltage sensor. In this case, the control device 18 acquires, as an electrical value, a voltage value (detected voltage value) detected by the voltage sensor in the case that the electrical current of the hydrogen compression stack 24 is of the predetermined value. The detector 78 may be a resistance sensor. In this case, the control device 18 acquires, as an electrical value, a resistance value (detected resistance value) detected by the resistance sensor in the case that the electrical current of the hydrogen compression stack 24 is of the predetermined value.

The voltage or the resistance may be calculated using Ohm's law. Therefore, using the value detected by the detector 78, the control device 18 may calculate the detected voltage value or the detected resistance value.

The detected voltage value may be a voltage value applied to both ends of the plurality of unit cells 28 provided in the hydrogen compression stack 24. Alternatively, the detected voltage value may be a voltage value of one of the unit cells 28 selected from among the plurality of unit cells 28. Alternatively, the detected voltage value may be a statistical value of each of respective voltage values of the plurality of unit cells 28. Alternatively, the detected voltage value may be a statistical value of the voltage values of two or more of the unit cells 28 selected from among the plurality of unit cells 28. As the statistical value, for example, there may be cited an average value, a median value, or a total value.

Similarly, the detected resistance value may be a resistance value detected at both ends of the plurality of unit cells 28 provided in the hydrogen compression stack 24. Alternatively, the detected resistance value may be a resistance value of one of the unit cells 28 selected from among the plurality of unit cells 28. Alternatively, the detected resistance value may be a statistical value of each of respective resistance values of the plurality of unit cells 28. Alternatively, the detected resistance value may be a statistical value of the resistance values of two or more of the unit cells 28 selected from among the plurality of unit cells 28. As the statistical value, for example, there may be cited an average value, a median value, or a total value.

Upon receiving the operation start command, the control device 18 executes a stack startup process. The stack startup process may be defined by a program. Alternatively, the stack startup process may be implemented by an integrated circuit such as an ASIC, an FPGA, or the like. Alternatively, the stack startup process may be implemented by an electronic circuit including a discrete device. Details of the stack startup process will be described later.

When the stack startup process is completed, the hydrogen supply valve 50, the inlet valve 68, and the outlet valve 56 are placed in an open state. Further, the pathway connector 62 is placed in a state in which the connection of the hermetically sealed container 38 to the supply pathway 46 is suspended. In this case, the hydrogen gas is supplied from the hydrogen supply source 14 to the hydrogen compression stack 24 via the supply pathway 46. Further, a portion of the hydrogen gas flowing through the supply pathway 46 flows into the humidifier 16 via the inlet pathway 66, and is humidified. The humidified hydrogen gas returns to the supply pathway 46 via the outlet pathway 54. Accordingly, a wet hydrogen gas containing the water vapor is supplied to the hydrogen compression stack 24.

Further, when the stack startup process is completed, a predetermined voltage is applied from the electrical power source device 26 to each of the unit cells 28 of the hydrogen compression stack 24. In this case, each of the unit cells 28 is supplied with an electrical current from the electrical power source device 26. An electrochemical reaction is carried out in each of the unit cells 28 based on the hydrogen gas supplied from the hydrogen supply source 14. As a result, the high pressure hydrogen gas is generated on the cathode side of each of the unit cells 28.

The control device 18 drives the pump 44 after having executed the stack startup process. Further, the control device 18 opens the discharge valve 42, and closes the vent valve 45. Consequently, the non-reacted hydrogen gas in the hydrogen compression stack 24 is supplied to the hermetically sealed container 38.

Further, after having executed the stack startup process, the control device 18 controls at least one of the degree to which the hydrogen supply valve 50 is opened or the degree to which the inlet valve 68 is opened, and thereby adjusts a flow rate ratio between the hydrogen gas that passes through the humidifier 16, and the hydrogen gas that does not pass through the humidifier 16.

Further, after having executed the stack startup process, based on a target generation amount of the high pressure hydrogen gas, the control device 18 controls the degree to which the flow rate adjustment valve 52 is opened, and thereby adjusts the flow rate of the hydrogen gas supplied to the hydrogen compression stack 24.

Figure 2:
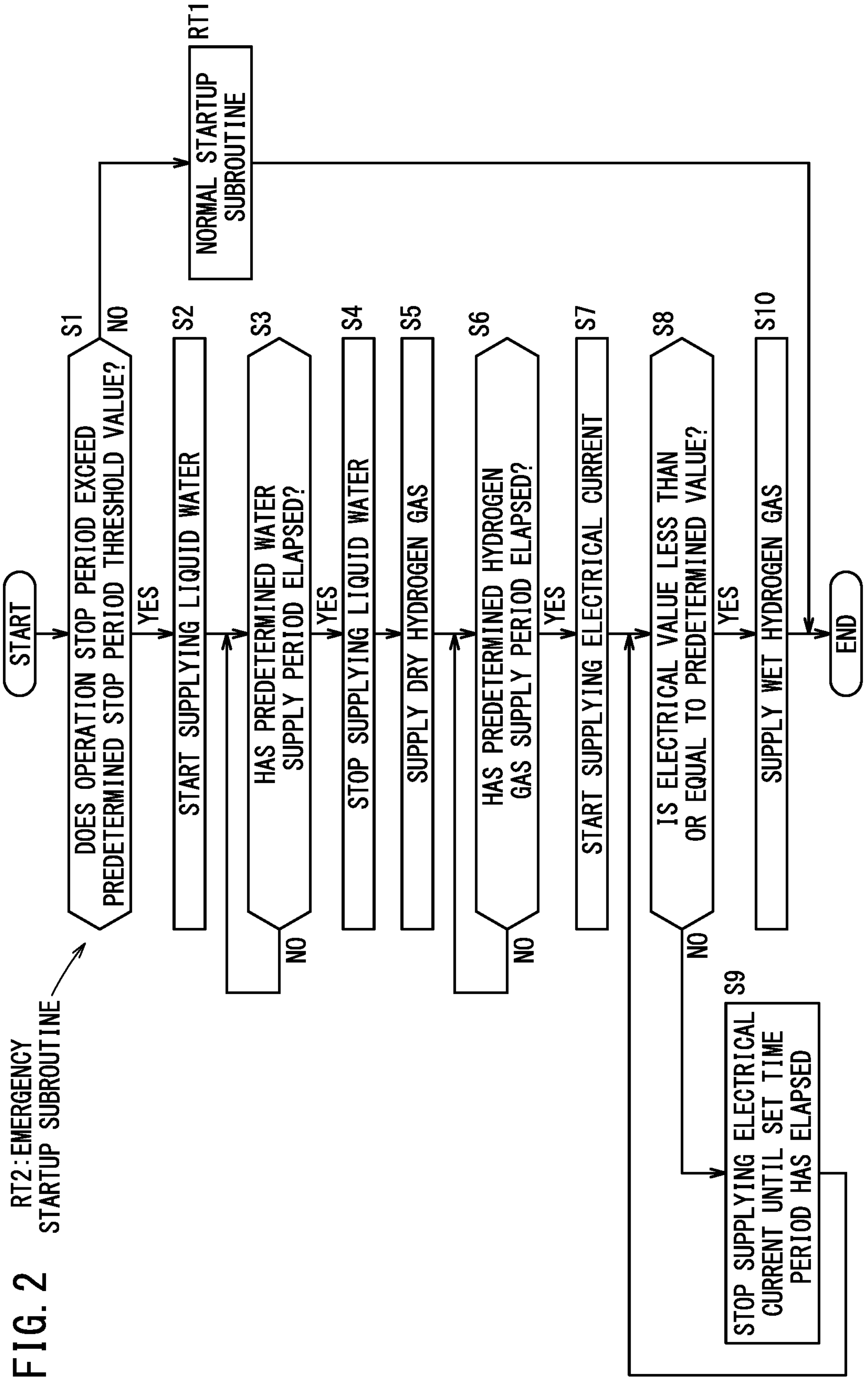
FIG. 2 is a flowchart showing a procedure of a stack startup process.

Next, the stack startup process which is performed by the control device 18 will be described. FIG. 2 is a flowchart showing the procedure of the stack startup process. Prior to initiating the stack startup process, the hydrogen compression stack 24 is in a stopped state. Further, the discharge valve 42, the hydrogen supply valve 50, the vent valve 45, the inlet valve 68, and the outlet valve 56 are in a closed state. Further, the pump 44 and the water supply device 60 are in a stopped state. Further, the pathway connector 62 is in a state in which the connection of the hermetically sealed container 38 to the supply pathway 46 is suspended. The stack startup process is initiated when an operation start command is imparted to the control device 18.

In step S1, the control device 18 compares an operation stop period of the hydrogen compression stack 24 with a predetermined stop period threshold value. The operation stop period is a period of time that has elapsed from the stoppage of the supply of the electrical current to the hydrogen compression stack 24.

In the case that the operation stop period is less than or equal to the predetermined stop period threshold value, the control device 18 determines that the rate of progression of drying of the electrolyte membranes 30 of each of the unit cells 28 is small. In this case, the control device 18 executes a normal startup subroutine RT1. In the normal startup subroutine RT1, the control device 18 opens the hydrogen supply valve 50, the inlet valve 68, and the outlet valve 56, and thereby supplies the wet hydrogen gas to the hydrogen compression stack 24. Further, the control device 18 controls the electrical power source device 26 and thereby applies a predetermined voltage to the hydrogen compression stack 24, and supplies the electrical current to the hydrogen compression stack 24. In accordance therewith, the stack startup process comes to an end.

On the other hand, in the case that the operation stop period exceeds the predetermined stop period threshold value, the control device 18 determines that the rate of progression of drying of the electrolyte membranes 30 of each of the unit cells 28 is large. In this case, the control device 18 starts an emergency startup subroutine RT2, whereupon the process transitions to step S2.

In step S2, the control device 18 controls the pathway connector 62, and thereby connects the hermetically sealed container 38 of the humidifier 16 to the supply pathway 46 via the water supply pathway 58. Further, the control device 18 drives the water supply device 60, and causes the supply of the liquid water from the hermetically sealed container 38 of the humidifier 16 to the hydrogen compression stack 24 to be started. Thereafter, the control device 18 transitions to step S3.

In step S3, the control device 18 determines whether or not a predetermined water supply period has elapsed from the supply of the liquid water to the hydrogen compression stack 24 being started. In the case that the water supply period has not elapsed, the control device 18 remains at step S3. On the other hand, when the water supply period has elapsed, the control device 18 transitions to step S4.

In step S4, the control device 18 stops the water supply device 60, and causes the supply of the liquid water to the hydrogen compression stack 24 to be stopped. Thereafter, the control device 18 transitions to step S5.

In step S5, without opening the inlet valve 68 and the outlet valve 56, the control device 18 opens the hydrogen supply valve 50, and causes the supply of dry hydrogen gas from the hydrogen supply source 14 to the hydrogen compression stack 24 to be started. The dry hydrogen gas is hydrogen gas that has not been humidified by the humidifier 16. After having opened the hydrogen supply valve 50, the control device 18 transitions to step S6.

In step S6, the control device 18 determines whether or not a predetermined hydrogen gas supply period has elapsed from the supply of the dry hydrogen gas to the hydrogen compression stack 24 being started. In the case that the hydrogen gas supply period has not elapsed, the control device 18 remains at step S6. On the other hand, in the case that the predetermined hydrogen gas supply period has elapsed, the control device 18 transitions to step S7.

In step S7, the control device 18 controls the electrical power source device 26, and thereby causes the supply of the electrical current to each of the unit cells 28 of the hydrogen compression stack 24 to be started. Thereafter, the control device 18 transitions to step S8.

In step S8, the control device 18, using the detector 78, acquires the electrical value in the case that the electrical current of the hydrogen compression stack 24 is of the predetermined value. When the control device 18 acquires the electrical value in the case that the electrical current of the hydrogen compression stack 24 is the predetermined value, the control device 18 compares the electrical value with a predetermined threshold value. When the electrical value exceeds the threshold value in the case that the electrical current of the hydrogen compression stack 24 is of the predetermined value, the control device 18 determines that the water contained in the unit cells 28 is excessive. In this case, the control device 18 transitions to step S9. On the other hand, when the electrical value is less than or equal to the threshold value in the case that the electrical current of the hydrogen compression stack 24 is of the predetermined value, the control device 18 determines that the water contained in the unit cells 28 is appropriate. In this case, the control device 18 transitions to step S10.

In step S9, the control device 18 controls the electrical power source device 26, and until the set time period has elapsed, causes the supply of the electrical current to the unit cells 28 to be stopped. Consequently, electrolysis of the water contained in the unit cells 28 is avoided. When the set time period has elapsed, the control device 18 returns to step S8.

In step S10, the control device 18 opens the inlet valve 68 and the outlet valve 56, and thereby causes the supply of the wet hydrogen gas to the hydrogen compression stack 24 to be started. When the supply of the wet hydrogen gas is started, the emergency start subroutine RT2 comes to an end. In this case as well, the stack startup process comes to an end.

In the foregoing manner, according to the present embodiment, first, the control device 18 causes the liquid water to be supplied to the hydrogen compression stack 24 until the predetermined water supply period has elapsed. Thereafter, the control device 18 causes the supply of the hydrogen gas to the hydrogen compression stack 24 to be started. After the predetermined hydrogen gas supply period has elapsed, the control device 18 causes the supply of the electrical current to the hydrogen compression stack 24 to be started.

Accordingly, after the electrolyte membranes 30 of the unit cells 28 have been uniformly impregnated with water, the water content of the electrolyte membranes 30 can be appropriately adjusted by being supplied with the hydrogen gas. In accordance therewith, the distribution of the water contained within the electrolyte membranes 30 can be made substantially uniform in a short time period. As a result, the hydrogen compression stack 24 can be started at an early stage.

Further, according to the present embodiment, the control device 18 closes the outlet valve 56 from the stoppage of the supply of the water until the supply of the electrical current is started. After the supply of the electrical current is started, the control device 18 opens the outlet valve 56. Consequently, the dry hydrogen gas can be supplied to the hydrogen compression stack 24 until the supply of the electrical current is started. Accordingly, the adjustment of the water content of the electrolyte membranes 30 can be completed at an early stage. Further, after the supply of the electrical current is started, the wet hydrogen gas can be supplied to the hydrogen compression stack 24. Accordingly, drying of the electrolyte membranes 30 during operation of the hydrogen compression stack 24 can be suppressed.

Further, according to the present embodiment, the control device 18, using the detector 78, acquires the electrical value in the case that the electrical current of the hydrogen compression stack 24 is of the predetermined value. In the case that the electrical value after the predetermined hydrogen gas supply period has elapsed is less than or equal to the predetermined threshold value, the control device 18 opens the outlet valve 56. Consequently, after the amount of the water contained in the electrolyte membranes 30 becomes an appropriate amount, the wet hydrogen gas can be supplied to the hydrogen compression stack 24.

Further, according to the present embodiment, in the case that the electrical value after the hydrogen gas supply period has elapsed does not become less than or equal to the predetermined threshold value, then until the set time period has elapsed, the control device 18 causes the supply of the electrical current to the hydrogen compression stack 24 to be stopped. Consequently, electrolysis of the water contained in the unit cells 28 can be suppressed. As a result, it is possible to reduce the possibility that the oxygen gas generated by the electrolysis of water will be discharged together with the hydrogen gas as an impure gas from the hydrogen compression stack 24.

Further, in the present embodiment, in the case that the operation stop period of the hydrogen compression stack 24 does not exceed the predetermined stop period threshold value, the control device 18 does not cause the water to be supplied to the hydrogen compression stack 24. On the other hand, in the case that the operation stop period of the hydrogen compression stack 24 exceeds the predetermined stop period threshold value, the control device 18 causes the water to be supplied to the hydrogen compression stack 24. Consequently, it is possible to avoid the case where the water is supplied to the hydrogen compression stack 24 even when the electrolyte membranes 30 are not dry. As a result, the hydrogen compression stack 24 can be started at an early stage. In addition thereto, it is possible to suppress a situation in which the deterioration of the electrolyte membranes 30 occurs rapidly, and further, to reduce the processing load on the control device 18.

The above-described embodiment can be modified in the following manner.

Exemplary Modification 1

Figure 3:
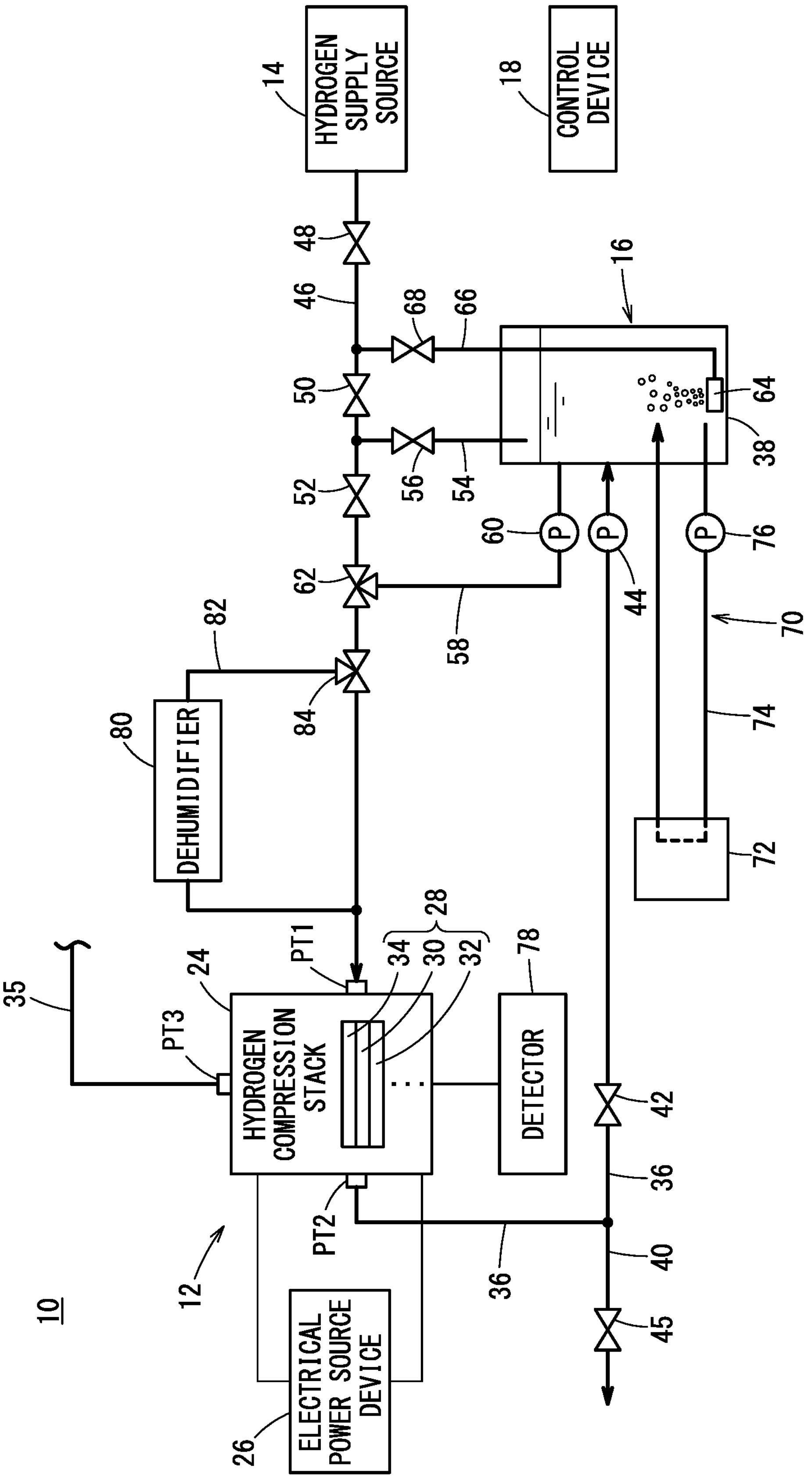
FIG. 3 is a schematic diagram showing an electrochemical hydrogen compression system according to an Exemplary Modification.

FIG. 3 is a schematic diagram showing the electrochemical hydrogen compression system 10 according to an Exemplary Modification. In FIG. 3, the same constituent elements as those described in the embodiment are designated by the same reference numerals. Moreover, it should be noted that in the present exemplary modification, explanations that overlap or are redundant with those of the embodiment will be omitted.

In the present exemplary modification, a dehumidifier 80, a dehumidification pathway 82, and a pathway switching device 84 are newly provided.

The dehumidifier 80 is a device that dehumidifies the hydrogen gas. The dehumidifier 80 is disposed in the dehumidification pathway 82. The dehumidifier 80, for example, cools the hydrogen gas flowing from upstream of the dehumidification pathway 82, and separates water from the hydrogen gas.

The dehumidification pathway 82 branches off from the supply pathway 46, and is connected to a location more downstream than the branched portion in the supply pathway 46. According to the present embodiment, the dehumidification pathway 82 branches off from a location more downstream than the flow rate adjustment valve 52 in the supply pathway 46. The dehumidification pathway 82 guides to the supply pathway 46 the dry hydrogen gas from which the water has been separated by the dehumidifier 80.

The pathway switching device 84 switches between whether or not to allow the hydrogen gas supplied from the hydrogen supply source 14 to flow in the dehumidification pathway 82, under the control of the control device 18. As the pathway switching device 84, there may be cited a three-way valve or the like. In FIG. 3, an example is shown in which the pathway switching device 84 is a three-way valve.

According to the present exemplary modification, the control device 18 causes the hydrogen gas to flow through the dehumidification pathway 82 from when the supply of the water is stopped until the supply of the electrical current is started. More specifically, in the case of the present exemplary modification, in step S5, without opening the inlet valve 68 and the outlet valve 56, in addition to opening the hydrogen supply valve 50, the control device 18 controls the pathway switching device 84. In this case, the control device 18 switches the pathway downstream from the pathway switching device 84, from the supply pathway 46 to the dehumidification pathway 82. Further, in the case of the present exemplary modification, in step S10, in addition to opening the inlet valve 68 and the outlet valve 56, the control device 18 controls the pathway switching device 84. In this case, the control device 18 switches the pathway downstream from the pathway switching device 84, from the dehumidification pathway 82 to the supply pathway 46.

In this manner, in the present exemplary modification, from when the supply of the liquid water is stopped until the supply of the electrical current is started, the control device 18 causes the dry hydrogen gas which is dehumidified by the dehumidifier 80 to be supplied to the hydrogen compression stack 24. Consequently, the adjustment of the water content of the electrolyte membranes 30 in which the water is uniformly contained can be completed at an early stage.

Exemplary Modification 2

In the case that the electrical value after the hydrogen gas supply period has elapsed does not become less than or equal to the predetermined threshold value (FIG. 2, step S8: NO), the control device 18 may cause the starting of the hydrogen compression stack 24 to be stopped. In this case, the control device 18 closes the hydrogen supply valve 50, and causes the supply of the hydrogen gas to the hydrogen compression stack 24 to be stopped. Further, the control device 18 controls the electrical power source device 26, and thereby causes the application of the predetermined voltage to the hydrogen compression stack 24 to be stopped, and causes the supply of the electrical current to the hydrogen compression stack 24 to be stopped. Consequently, it is possible to prevent the hydrogen compression stack 24 from continuing to operate in a state in which the efficiency in generating the high pressure hydrogen gas is unsatisfactory.

Exemplary Modification 3

In the case that the electrical value after the hydrogen gas supply period has elapsed does not become less than or equal to the predetermined threshold value (FIG. 2, step S8: NO), then until the set time period has elapsed, the control device 18 causes the supply of the electrical current to the hydrogen compression stack 24 to be made smaller. In this case, the control device 18 causes the magnitude of the electrical current supplied to the hydrogen compression stack 24 to be made smaller than when the supply thereof was started in step S7. Consequently, electrolysis of the water contained in the unit cells 28 can be suppressed. As a result, it is possible to reduce the possibility that the oxygen gas generated by the electrolysis of water will be discharged together with the high pressure hydrogen gas as an impure gas from the hydrogen compression stack 24.

Exemplary Modification 4

The water source need not necessarily be the humidifier 16. For example, the water source may be a water tank, a water purification facility, or the like.

Exemplary Modification 5

The bubble generator 64, the inlet pathway 66, and the inlet valve 68 may be excluded from the electrochemical hydrogen compression system 10. Even without providing the bubble generator 64, the inlet pathway 66, and the inlet valve 68, the hydrogen gas flowing through the supply pathway 46 can still be humidified. Accordingly, even without providing the bubble generator 64, the inlet pathway 66, and the inlet valve 68, the same advantageous effects as those of the above-described embodiment can be obtained.

Hereinafter, a description will be given concerning the invention and the advantageous effects that are capable of being grasped from the description provided above.

(1) The present invention is characterized by the electrochemical hydrogen compression system (10) including the hydrogen compression stack (24) equipped with the unit cell (28) including the electrolyte membrane (30), the anode (32), and the cathode (34), the electrical power source device (26) configured to supply the electrical current to the hydrogen compression stack, and to generate the high pressure hydrogen gas having a higher pressure than the hydrogen gas supplied to the hydrogen compression stack, and the hydrogen supply source (14) configured to supply the hydrogen gas to the hydrogen compression stack via the supply pathway (46) communicating with the anode side of the unit cell. The electrochemical hydrogen compression system further includes the hydrogen supply valve (50) disposed in the supply pathway, the pathway connector (62) configured to connect the water source to the supply pathway via the water supply pathway (58), or alternatively, to disconnect the connection, the water supply device (60) configured to supply the liquid water from the water source to the hydrogen compression stack, and the control device (18) configured to control the electrical power source device, the hydrogen supply valve, the pathway connector, and the water supply device. The control device, upon receiving the operation start command, causes the liquid water to be supplied from the water source to the hydrogen compression stack until the predetermined water supply period has elapsed, and thereafter, causes the supply of the hydrogen gas to the hydrogen compression stack to be started, and after the predetermined hydrogen gas supply period has elapsed, causes the supply of the electrical current to the hydrogen compression stack to be started.

According to the present invention, after the electrolyte membrane of the unit cell has been uniformly impregnated with water, the water content of the electrolyte membrane can be appropriately adjusted by being supplied with the hydrogen gas. Consequently, the distribution of the water contained within the electrolyte membrane can be made substantially uniform in a short time period. As a result, the hydrogen compression stack can be started at an early stage.

(2) In the present invention which is characterized by the electrochemical hydrogen compression system according to the above-described item (1), there may further be provided the humidifier (16) configured to supply the water vapor to the supply pathway via the outlet pathway (54), and the outlet valve (56) disposed in the outlet pathway and controlled by the control device, wherein the control device may close the outlet valve during the period from when the supply of the liquid water is stopped until the supply of the electrical current is started, and after the supply of the electrical current is started, may open the outlet valve.

In accordance with such features, the dry hydrogen gas can be supplied to the hydrogen compression stack until the supply of the electrical current is started. Accordingly, the adjustment of the water content of the electrolyte membrane can be completed at an early stage. Further, after the supply of the electrical current is started, the wet hydrogen gas can be supplied to the hydrogen compression stack. Accordingly, drying of the electrolyte membrane during operation of the hydrogen compression stack can be suppressed.

(3) In the present invention which is characterized by the electrochemical hydrogen compression system according to the above-described item (2), there may further be provided the detector (78) configured to detect the electrical value indicating the voltage or the resistance of the hydrogen compression stack, wherein, after the hydrogen gas supply period has elapsed, when the electrical value is less than or equal to the predetermined threshold value in the case that the electrical current of the hydrogen compression stack is of a predetermined value, the control device may open the outlet valve.

In accordance with such features, from the amount of the water contained in the electrolyte membranes becoming an appropriate amount, the wet hydrogen gas can be supplied to the hydrogen compression stack.

(4) In the present invention which is characterized by the electrochemical hydrogen compression system according to the above-described item (3), after the hydrogen gas supply period has elapsed, when the electrical value does not become less than or equal to a predetermined threshold value in the case that the electrical current of the hydrogen compression stack is of the predetermined value, the control device may cause the supply of the hydrogen gas and the electrical current to the hydrogen compression stack to be stopped.

In accordance with such features, it is possible to prevent the hydrogen compression stack from continuing to operate in a state in which the efficiency in generating the high pressure hydrogen gas is unsatisfactory.

(5) In the present invention which is characterized by the electrochemical hydrogen compression system according to the above-described item (3), after the hydrogen gas supply period has elapsed, when the electrical value does not become less than or equal to the predetermined threshold value in the case that the electrical current of the hydrogen compression stack is of the predetermined value, the control device may cause the supply of the electrical current to the hydrogen compression stack to be stopped, or may cause the magnitude of the electrical current to be made smaller, until the set time period has elapsed.

In accordance with such features, electrolysis of the water contained in the unit cell can be suppressed. As a result, it is possible to reduce the possibility that the oxygen gas generated by the electrolysis of water will be discharged together with the high pressure hydrogen gas as an impure gas from the hydrogen compression stack.

(6) In the present invention which is characterized by the electrochemical hydrogen compression system according to the above-described item (2), the water source may be the humidifier.

In accordance with this feature, as compared to a case in which the water source is a tank or the like, the number of component parts of the electrochemical hydrogen compression system can be reduced.

(7) In the present invention which is characterized by the electrochemical hydrogen compression system according to the above-described item (1) or item (2), there may further be provided the dehumidifier (80) configured to branch off from the supply pathway, and is disposed in the dehumidification pathway (82) connected more downstream than the branched portion in the supply pathway, and configured to dehumidify the hydrogen gas, and the pathway switching device (84) configured to switch between whether or not the hydrogen gas supplied from the hydrogen supply source flows through the dehumidification pathway under the control of the control device, wherein the control device may cause the hydrogen gas to flow through the dehumidification pathway from when the supply of the liquid water is stopped until the supply of the electrical current is started, and may cause the hydrogen gas that was dehumidified by the dehumidifier to be supplied to the hydrogen compression stack.

In accordance with such features, the adjustment of the water content of the electrolyte membrane in which the water is uniformly contained can be completed at an early stage.

(8) In the present invention which is characterized by the electrochemical hydrogen compression system according to the above-described item (1) or item (2), in the case that the operation stop period of the hydrogen compression stack exceeds the predetermined stop period threshold value, the control device may cause the water to be supplied from the water source to the hydrogen compression stack.

In accordance with this feature, electrolysis of the water contained in the unit cell can be suppressed. As a result, it is possible to reduce the possibility that the oxygen gas generated by the electrolysis of water will be discharged together with the high pressure hydrogen gas as an impure gas from the hydrogen compression stack 24.

It should be noted that the present invention is not limited to the disclosure described above, and various additional or alternative configurations could be adopted therein without departing from the essence and gist of the present invention.

The invention claimed is:

1. An electrochemical hydrogen compression system comprising:

a hydrogen compression stack equipped with a unit cell including an electrolyte membrane, an anode, and a cathode;

an electrical power source device configured to supply an electrical current to the hydrogen compression stack, and to generate a high pressure hydrogen gas having a higher pressure than the hydrogen gas supplied to the hydrogen compression stack; and a hydrogen supply source configured to supply the hydrogen gas to the hydrogen compression stack via a supply pathway communicating with an anode side of the unit cell;

a hydrogen supply valve disposed in the supply pathway;

a pathway connector configured to connect a water source to the supply pathway via a water supply pathway, or alternatively, to disconnect the connection, and wherein the water source is a humidifier;

a water supply device configured to supply liquid water from the water source to the hydrogen compression stack; and a control device configured to control the electrical power source device, the hydrogen supply valve, the pathway connector, and the water supply device;

wherein the control device comprises one or more processors configured to execute computer executable instructions that are stored in a memory, and by the computer executable instructions being executed by the one or more processors, the control device, upon receiving an operation start command, causes the liquid water to be supplied from the water source to the hydrogen compression stack until a predetermined water supply period has elapsed, and thereafter, causes supply of the hydrogen gas to the hydrogen compression stack to be started, and after a predetermined hydrogen gas supply period has elapsed, causes supply of the electrical current to the hydrogen compression stack to be started.

2. The electrochemical hydrogen compression system according to claim 1, further comprising:

the humidifier configured to supply water vapor to the supply pathway via an outlet pathway; and an outlet valve disposed in the outlet pathway and controlled by the control device;

wherein the control device closes the outlet valve during a period from when the supply of the liquid water is stopped until the supply of the electrical current is started, and after the supply of the electrical current is started, opens the outlet valve.

3. The electrochemical hydrogen compression system according to claim 2, further comprising:

a detector configured to detect an electrical value indicating a voltage or a resistance of the hydrogen compression stack;

wherein, after the hydrogen gas supply period has elapsed, when the electrical value is less than or equal to a predetermined threshold value in a case that the electrical current of the hydrogen compression stack is of a predetermined value, the control device opens the outlet valve.

4. The electrochemical hydrogen compression system according to claim 3, wherein, after the hydrogen gas supply period has elapsed, when the electrical value does not become less than or equal to a predetermined threshold value in a case that the electrical current of the hydrogen compression stack is of the predetermined value, the control device causes the supply of the hydrogen gas and the electrical current to the hydrogen compression stack to be stopped.

5. The electrochemical hydrogen compression system according to claim 3, wherein, after the hydrogen gas supply period has elapsed, when the electrical value does not become less than or equal to a predetermined threshold value in a case that the electrical current of the hydrogen compression stack is of the predetermined value, the control device causes the supply of the electrical current to the hydrogen compression stack to be stopped, or causes a magnitude of the electrical current to be made smaller, until a set time period has elapsed.

6. The electrochemical hydrogen compression system according to claim 1, further comprising:

a dehumidifier configured to branch off from the supply pathway, and be disposed in a dehumidification pathway connected more downstream than a branched portion in the supply pathway, and configured to dehumidify the hydrogen gas; and a pathway switching device configured to switch between whether or not the hydrogen gas supplied from the hydrogen supply source flows through the dehumidification pathway under control of the control device;

wherein the control device causes the hydrogen gas to flow through the dehumidification pathway from when the supply of the liquid water is stopped until the supply of the electrical current is started, and causes the hydrogen gas that was dehumidified by the dehumidifier to be supplied to the hydrogen compression stack.

7. The electrochemical hydrogen compression system according to claim 1, wherein, in a case that an operation stop period of the hydrogen compression stack exceeds a predetermined stop period threshold value, the control device causes the water to be supplied from the water source to the hydrogen compression stack.

* * * * *